Dec. 12, 1950 C. MOREY ET AL 2,533,680
TOOL LIFTER FOR PLANERS
Filed March 3, 1945 7 Sheets-Sheet 4
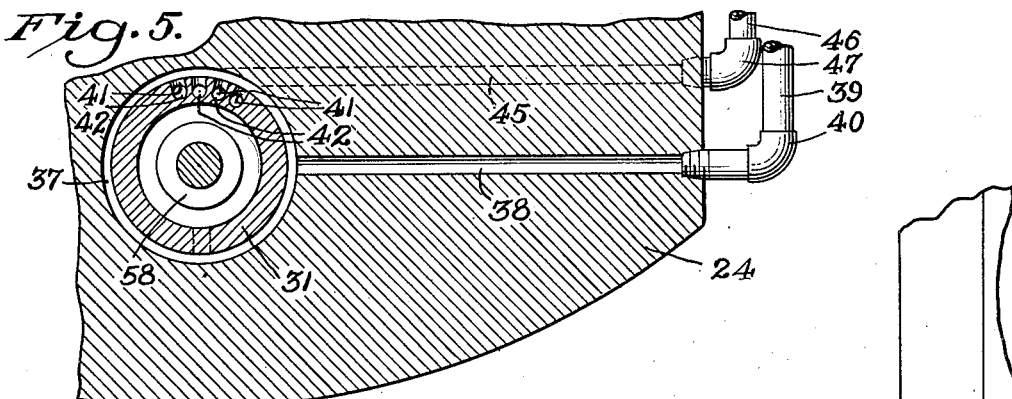
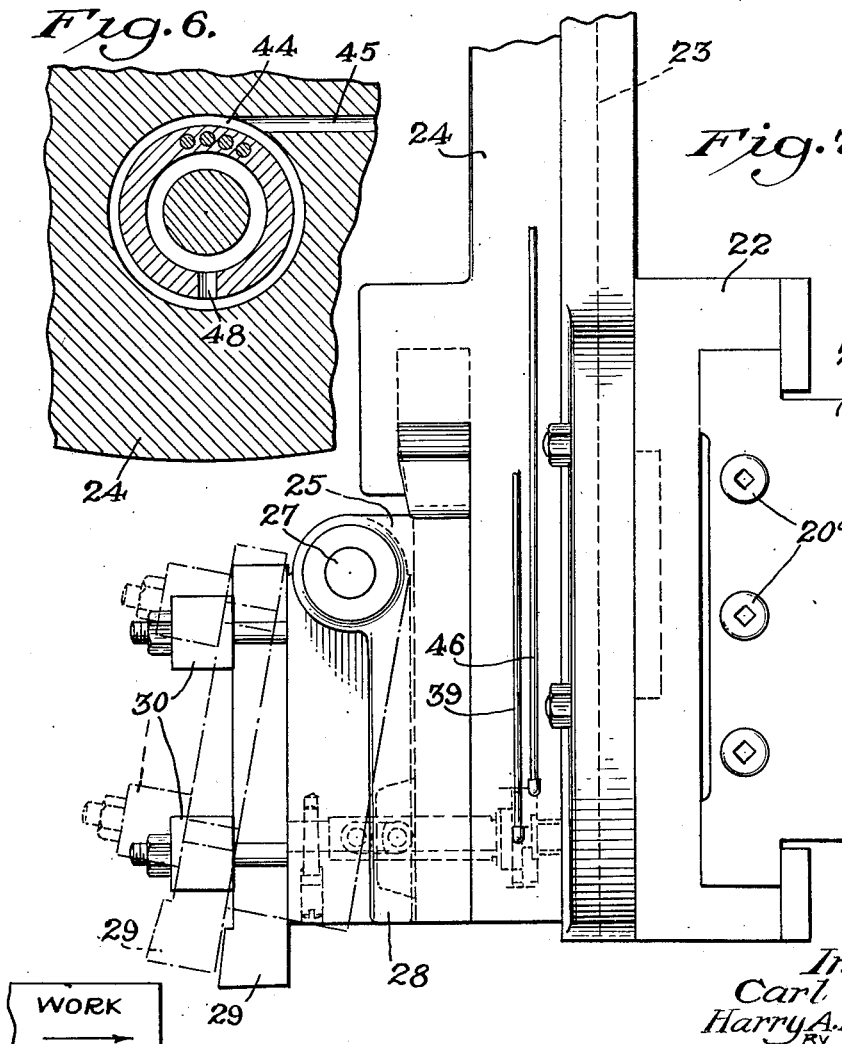
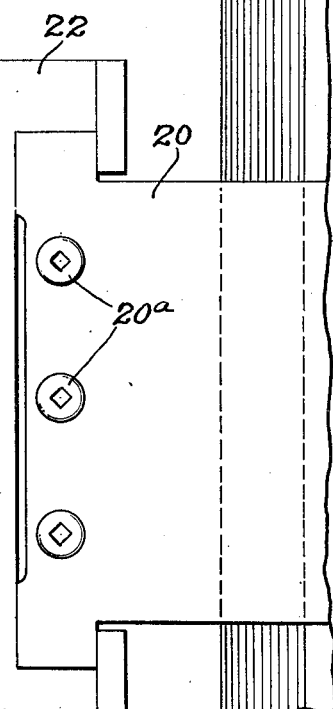
Inventor
Carl Morey
Harry A. Dingeldein
By
Edward W. Weikert
Attorney.

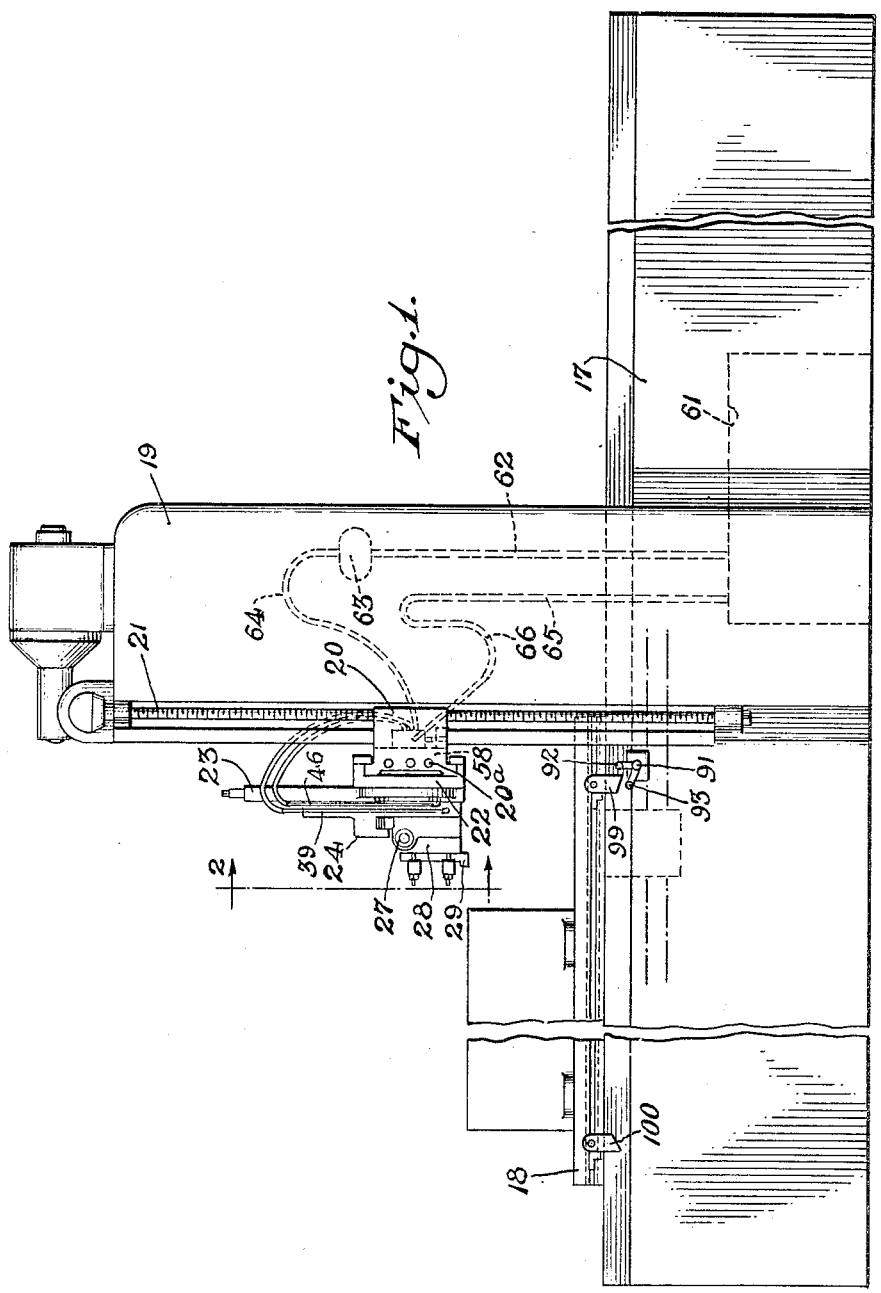

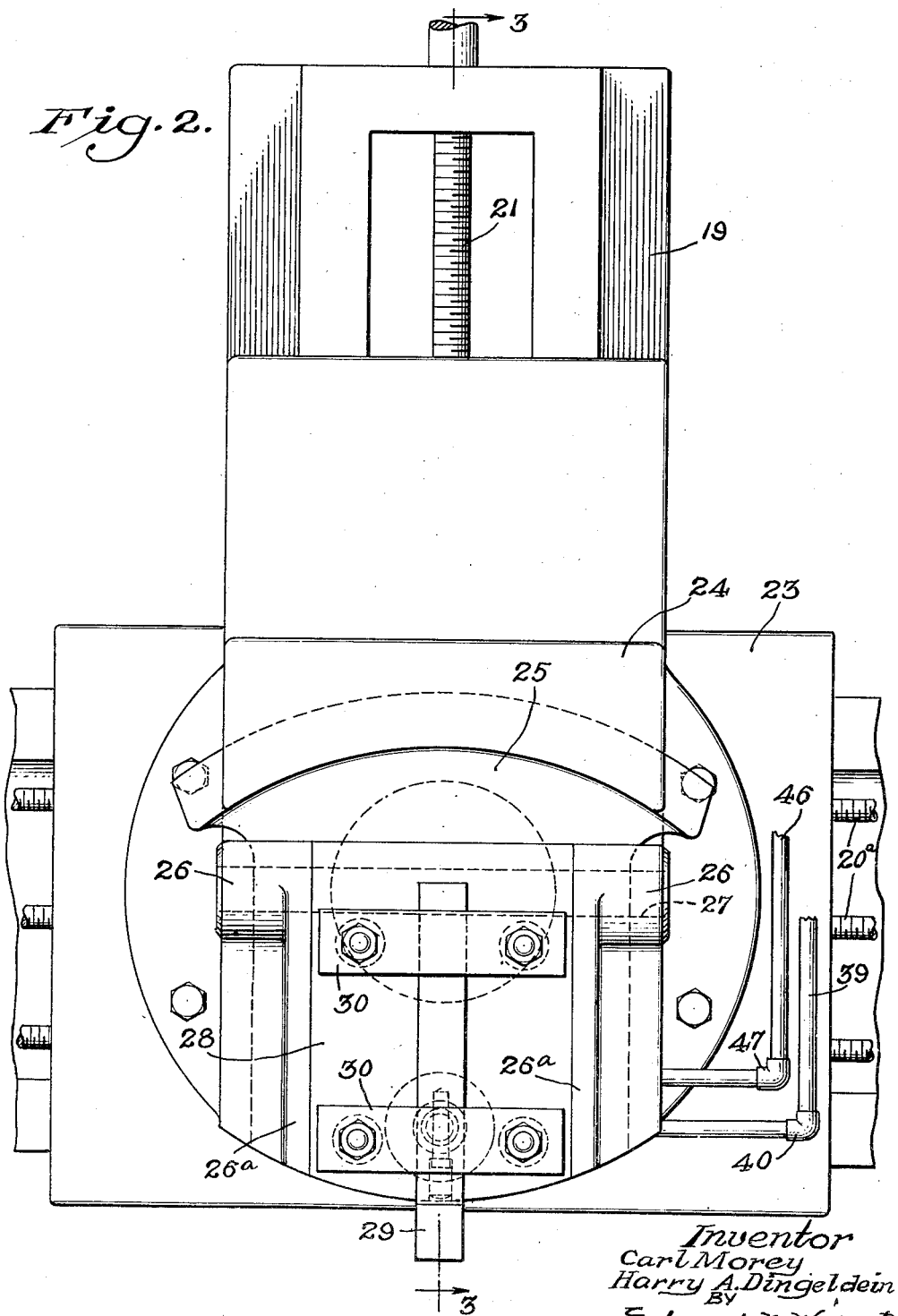

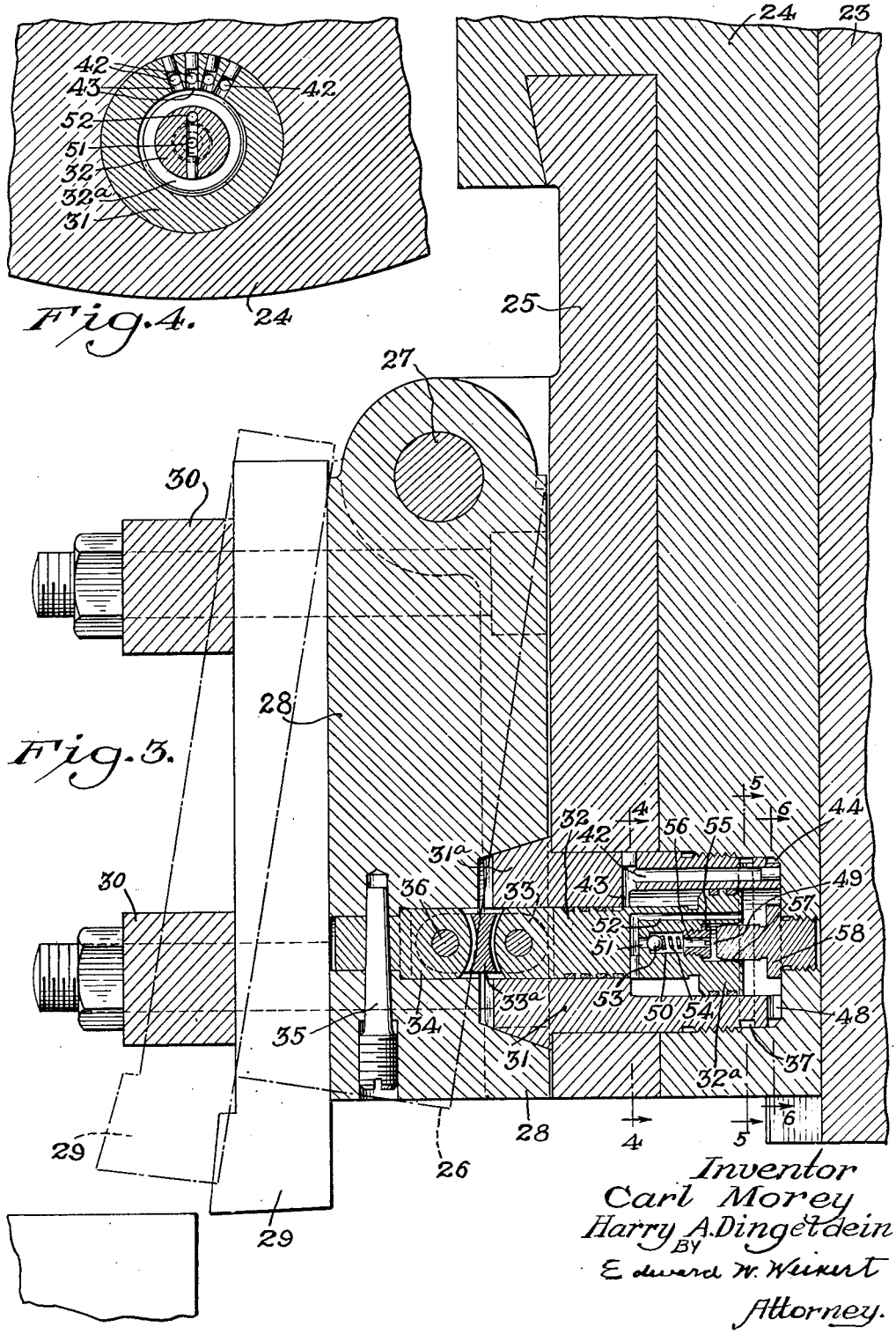

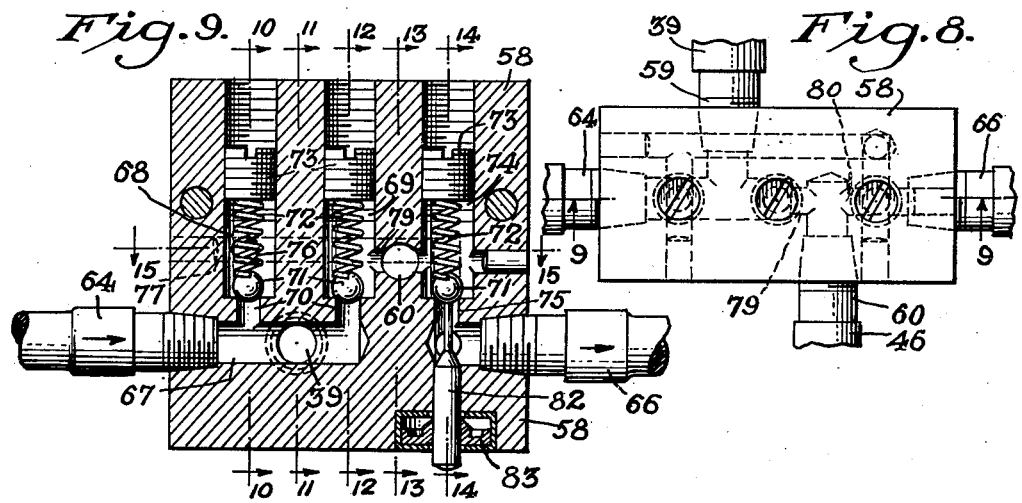
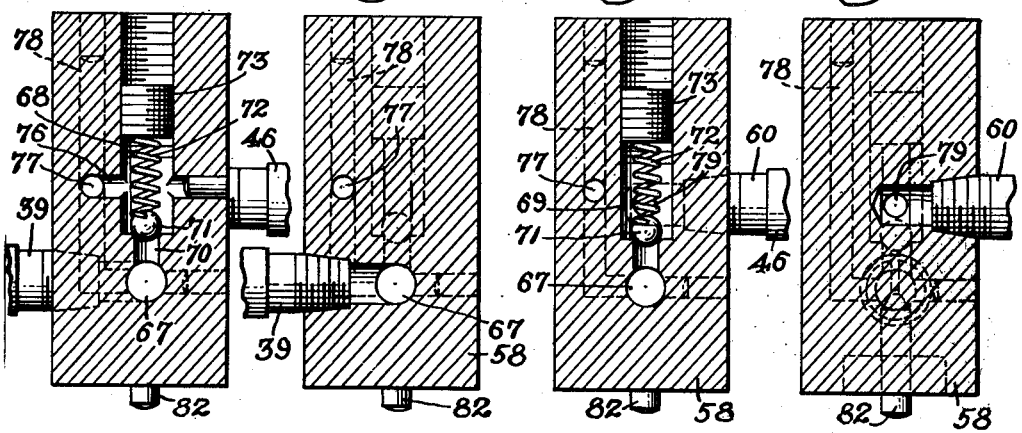
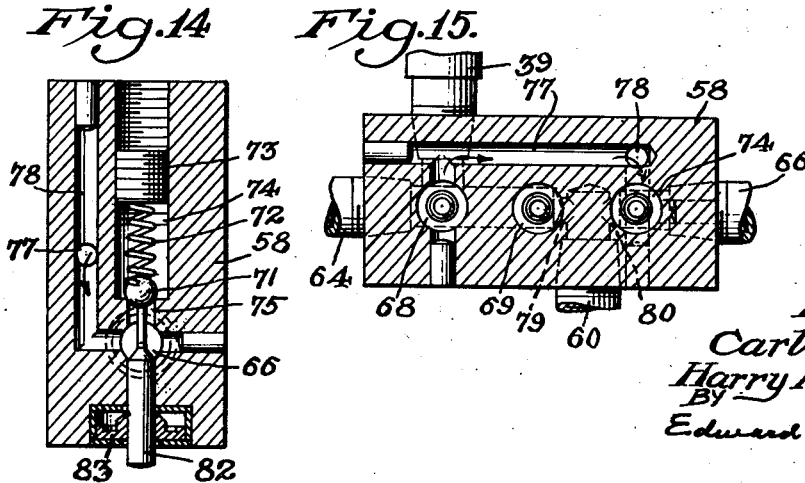

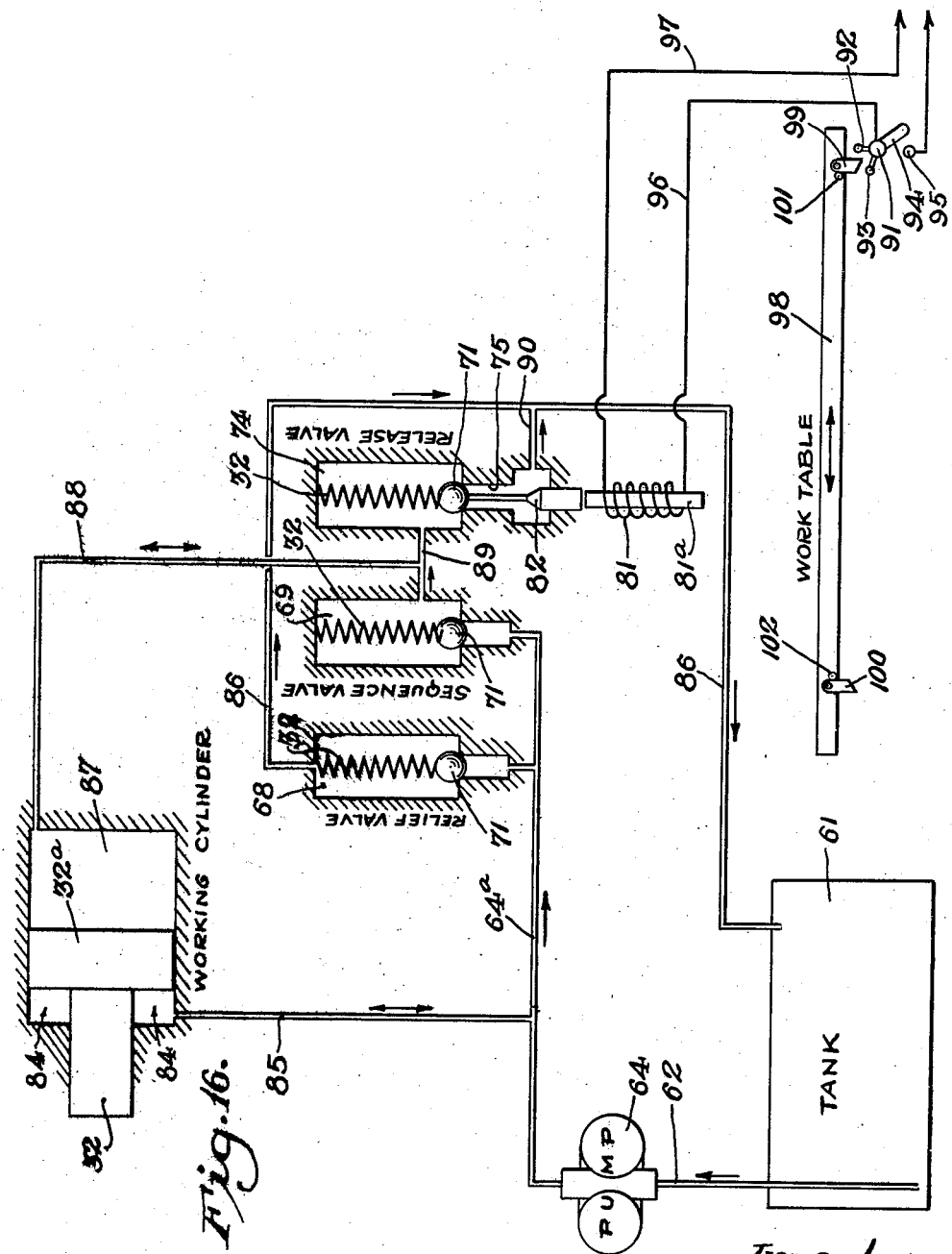

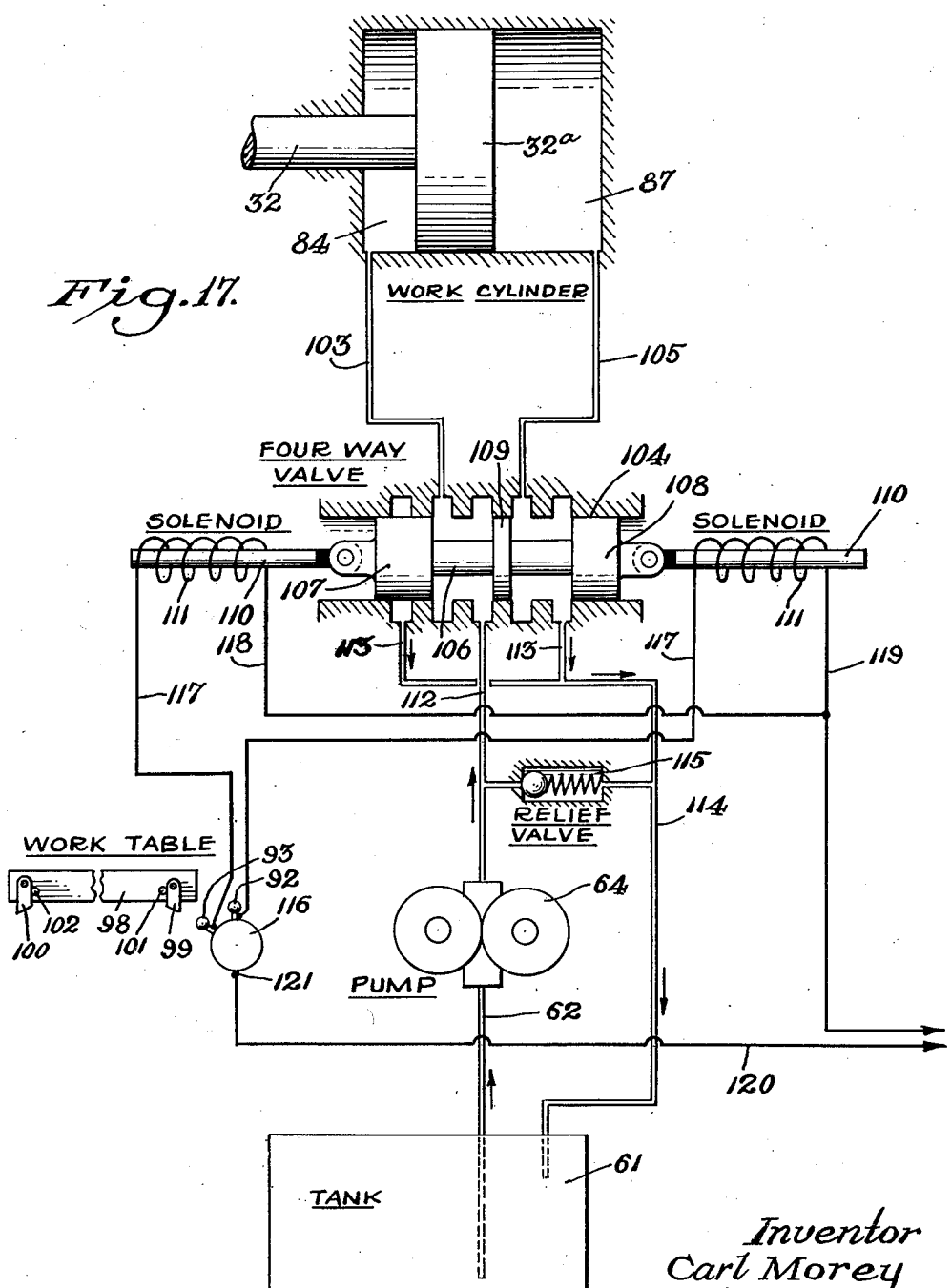

Patented Dec. 12, 1950

2,533,680

UNITED STATES PATENT OFFICE 2,533,680

TOOL LIFTER FOR PLANERS

Carl Morey and Harry A. Dingeldein, Hamilton, Ohio, assignors to Liberty Planers, a partnership Application March 3, 1945, Serial No. 580,756

8 Claims. (Cl. 90—55)

This invention relates to a tool lifter for planers and concerns itself primarily with novel means for raising the tool holder or block with its cutting tool attached clear of the work during the return stroke and for positively moving the tool holder and tool into cutting position and maintaining the same against the tool holder support during the cutting stroke.

In its broadest aspects, the invention comprises fluid operated means which is automatically controlled for lifting the tool holder and maintaining the same in elevated position during the return stroke of the tool and for positively moving the tool holder with its cutting tool into cutting position at the end of the return stroke and firmly maintaining the tool holder against its support or clapper box during the cutting stroke of the tool holder.

More specifically, the invention comprises a fluid pressure system involving a differential piston in which one pressure face or side of the piston is larger than the other and in which means are provided for maintaining a constant pressure in the cylinder that contains the piston upon the side of the piston having the smaller pressure area and a controlled pressure in the cylinder against the other side or face of the piston. The invention further comprises means responsive to the operation of the planer for governing the controlled pressure chamber.

The invention further includes hydraulic dash pot means between the piston and cylinder for cushioning the tool holder when it is returning to cutting position.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Fig. 1 is an elevational view of a planer involving this invention.

Fig. 2 is a front elevational view of the clapper box and associated parts.

Fig. 3 is an enlarged sectional view taken upon the line 3—3 of Fig. 2 looking in the direction of the arrows.

Fig. 4 is an enlarged sectional view taken upon the line 4—4 of Fig. 3 looking in the direction of the arrows.

Fig. 5 is an enlarged sectional view taken upon the line 5—5 of Fig. 3 looking in the direction of the arrows.

Fig. 6 is an enlarged sectional view taken upon the line 6—6 of Fig. 3 looking in the direction of the arrows.

Fig. 7 is an enlarged and fragmentary side elevational view of the clapper box and associated parts.

Fig. 8 is a top plan view of the valve structure of the fluid pressure system.

Fig. 9 is an enlarged sectional view taken upon the line 9—9 of Fig. 8 looking in the direction of the arrows.

Fig. 10 is an enlarged sectional view taken upon the line 10—10 of Fig. 9 looking in the direction of the arrows.

Fig. 11 is an enlarged sectional view taken upon the line 11—11 of Fig. 9 looking in the direction of the arrows.

Fig. 12 is an enlarged sectional view taken upon the line 12—12 of Fig. 9 looking in the direction of the arrows.

Fig. 13 is an enlarged sectional view taken upon the line 13—13 of Fig. 9 looking in the direction of the arrows.

Fig. 14 is an enlarged sectional view taken upon the line 14—14 of Fig. 9 looking in the direction of the arrows.

Fig. 15 is an enlarged sectional view taken upon the line 15—15 of Fig. 9 looking in the direction of the arrows.

Fig. 16 is a diagrammatic view of the oil or fluid circuit, and

Fig. 17 is a diagrammatic view of a modified form of the fluid pressure system.

In the drawings which illustrate the preferred embodiment of this invention as applied to a planer which may include various metal cutting machines and which should be taken as illustrative, there is shown in Fig. 1 a conventional type of planer having a bed 17, a table 18 that reciprocates upon the bed and a housing 19 which may be in the form of an inverted U extending over the table as is well known in the art.

A cross rail 20 is supported by the housing 19 for vertical adjustment by means of screw rods 21 on the housing. This cross rail carries a saddle 22 (Figs. 1 and 7) which is longitudinally movable thru a connection with one or more of the screw rods 20a carried by the rail. A swivel member 23 adjustable for angles is secured to the saddle 22 and a tool slide 24 is supported against the swivel member 23. The tool slide 24 carries a tool holder support or clapper box 25 having spaced ears 26 (Fig. 2) and guide ribs 26a extending from said ears. A shaft 27 is mounted in said ears and a tool holder 28 is swingably mounted upon said shaft and carries a cutting tool 29 fastened thereto by the bolted plates 30 or in any suitable manner. The tool holder 28 is adapted to be swung from full line position shown in Fig. 3 to dotted line position and then back again to cutting position by hydraulic means involving a fluid pressure system.

A cylinder 31 (Fig. 3) is provided with a conical head 31a over which the tool holder 28 fits, the tool holder having a conical depression in its rear face for receiving the head. The cylinder 31 extends thru the clapper box 25 and is threaded in the tool slide 24 which forms the rear end of the cylinder. It will be noted that the cylinder has a cylindrical fluid chamber in its rear portion and a bearing or guide passage extending forwardly from said chamber thru the head of the cylinder.

A piston generally denoted by the reference character 32 is mounted in said cylinder. The piston comprises the head 32a which will be called the piston proper and which is located in the cylinder chamber with its stem extending forwardly thru the bearing or guide passage of the cylinder. The forward end of the piston stem is connected by a swivel link 33 to an anchor bar 34 in the tool holder secured by pin 35. The link is connected to said parts by pivot pins 36.

The link 33 has a center cross piece 33a that is preferably concave upon both sides and the adjacent ends of the piston stem and anchor bar are preferably convex to provide vertical swivel action. Likewise the ends of the link 33 are convex and work in convex parts of the piston stem. This construction provides sufficient pivotal action for the upward swinging movement of the tool holder to allow the tool to return clear of the work. Of course, any other suitable pivotal connection may be used.

A fluid pressure system has been provided for supplying fluid such as oil to the cylinder upon both sides of the piston under a predetermined pressure which may be changed as desired. In the present instances, the left hand face of the piston, on account of the stem, has the smaller pressure area; the right hand side or face having the larger pressure area. As a result, when fluid under the same pressure is forced into both sides of the piston, the total force acting against the larger pressure area will overcome the pressure acting against the smaller pressure area of the piston and move the same to the left and force the fluid in the left part of the cylinder to escape or back up in the system. To move the piston to the right, the fluid or oil in the right hand end of the cylinder is released through an automatically operated valve as will later more fully appear.

Around the circumference of the cylinder 31, there is a groove 37 that communicates with a groove 38 in the tool slide 24. A fluid pipe or hose 39 (Fig. 5) is connected to the slide 24 through a pipe connection 40 threaded in the outer end of the groove 38. The groove 37 which is a fluid inlet groove communicates with four ducts 41 in the cylinder, each of which leads to a groove 42 extending to the inner end of the piston chamber.

The grooves 42 communicate with ducts 43 (Fig. 4) which discharge into the cylinder upon the left side of the piston 32a producing a constant pressure therein as will later appear.

Adjacent the rear end of the piston chamber, there is another circumferential groove 44 (Fig. 6) around the cylinder. The groove 44 communicates with a groove 45 in the tool slide 24. The groove 45 communicates with a pipe or hose 46 thru connection 47 threaded in the groove 45. The groove 44 also communicates with a duct 48 leading to the cylinder upon the right side of the piston 32a. Thus fluid can enter and escape from the right hand compartment of the piston chamber thru the passages just described. This compartment may be termed the controllable pressure compartment. The compartment on the left hand side of the piston is the constant pressure compartment.

A dash pot arrangement (Fig. 3) has been provided for cushioning the impact of the piston 32a at the right hand end of the stroke. In the rear of the piston 32a, there is a central bore 49 from which an inwardly extending small bore 50 extends. The bore 50 communicates with a port 51 which in turn communicates with a fluid inlet passage 52 which is right angular and extends to the rear end of the piston to receive fluid from the controllable pressure chamber.

A ball valve 53 in the bore 50 normally closes the port 51. The ball valve 53 is yieldingly held in place by a coil spring 54 abutting a tap 55 threaded in the right hand end of the small bore 50. The tap 55 has a through passage 56 communicating with the larger bore 49. An impact abutment 57 which is threaded in the slide 24 and braced by shoulders 58 extends into the bore 49 and is adapted to be contacted by the fluid cushion.

When the piston has been moved to the left, it will be beyond the abutment 57 which in turn will be rearward and clear of the bore 49 which will be filled with fluid such as oil, from the right hand chamber. When the piston moves to the right, the abutment 57 will enter the bore and trap the fluid therein for forming a cushion; the abutment 57 which is circular is slightly smaller than the bore 49 for providing a bleeder passage. When the piston moves to the left again, fluid will enter the passage 52, port 51 and bore 49 to compensate for the vacuum created therein, until the piston passes beyond the abutment 57.

The pipe hose 39 is connected with a valve housing 58 (Figs. 8 to 15) as indicated at 59. The valve housing is carried by the cross rail as shown in Fig. 1. It may be variously formed and located. The controlled pressure pipe 46 is connected to the valve housing as indicated at 60. The valve housing is also connected with an oil supply tank 61 (Fig. 1) by means of a pipe 62, power pump 63 and hose 64. The valve housing 58 is further connected with the tank 61 by an oil return pipe 65 and hose 66.

The hose 64 communicates with a horizontal oil inlet passage 67 in the valve housing which passage communicates with the constant pressure pipe 39 as shown in Fig. 9. Above the passage 67 in the valve housing are valves generally denoted by the references 68 and 69. The valve 68 is a relief valve, while the valve 69 is termed a sequence valve. These valves communicate with the passage 67 through ports 70 which are normally closed by ball valves 71 held in yielding positions by coil springs 72 which are confined in the valve chambers above the ball valves by adjustable plugs 73 threaded in the chambers through the open tops thereof.

In alinement with the valves 68 and 69, there is a release valve 74 comprising ball valve member 71 which controls a port 75, a coil spring 72 acting upon the ball and a plug 73 threaded in the housing and pressing against the spring.

The relief valve 68 communicates with a port 76 leading to a horizontal passage 77 in the valve housing. The passage 77 communicates with a vertical passage 78 (Fig. 14) adjacent release valve 74. The passage 78 extends at right angles at its lower end and communicates with the fluid return pipe 66 below the ball valve of the release valve 74. Should the pressure in the system rise above the predetermined constant pressure, the relief valve will open and allow fluid to return to the tank until the pressure is corrected.

The sequence valve serves to maintain pressure in the constant pressure area of the fluid circuit. It is set to do the necessary work of moving the piston to the right and pulling the tool block into cutting position. When the piston reaches the limit of its travel to the right, the sequence valve permits the excess fluid to pass into the release valve and therethrough to the supply tank since the ball valve will be held open by the solenoid as will later more fully appear. The pressure maintained in the constant pressure area by the sequence valve provides a constant force acting to pull the tool block against its support or clapper box. This is an important feature in operation. It will be noted that this sequence valve 69 communicates with a passage 79 just above the ball valve 71 which passage 79 leads to the controlled pressure pipe connection 60 as shown in Fig. 13. The controlled pressure pipe connection 60 also communicates with the release valve 74 by means of a port 80.

The release valve is automatically controlled by a push up solenoid 81 (Fig. 16). This solenoid pushes up a stem or rod 82 attached to the ball valve 71 of the release valve. The lower portion of this rod is slidably mounted in a suitable bearing generally denoted by the reference 83 and which is mounted in a recess in the valve housing.

In Fig. 16 there is shown a diagrammatic view of the oil or fluid circuit and the manner in which it is controlled. In this view, there is shown an oil or fluid tank 61 with the feed pipe 62, pump 64 and pipe 64a which delivers oil to four points, namely, to the constant pressure chamber 84 by pipe 85 which chamber is upon the left hand side of the piston in the cylinder, to the lower portion of the relief valve 68, to the sequence valve which will open and from the sequence valve to the controlled pressure chamber upon the right side of the piston.

In Fig. 16, the relief valve 68 is shown as connected by the return fluid pipe 86 to the fluid tank, the pipe 86 corresponding to the passages 76, 77 and 66 previously set forth.

The controlled pressure chamber 87 is connected by a pipe 88 with a short pipe 89 which connects valves 69 and 74. Thus it will be seen that the pump can deliver fluid to the controlled pressure chamber 87 thru the sequence valve.

The solenoid 81 is shown in circuit with a switch 91 which may be a snap switch or any suitable type. This switch has a pair of operated arms 92 and 93 and a movable contact arm 94 for engaging a stationary contact 95. One terminal 96 of the solenoid coil is connected with the switch arm 94 while the other terminal 97 goes to a source of current and completes the circuit thru a connection between the source of current and the movable switch arm.

Upon the work table 98 are lugs 99 and 100 which are located in the plane of the switch arms so as to strike the same during operation for opening and closing the switch. The lug 99 is pivoted to the table and abuts a pin 101 projecting from the table adjacent the left hand side of the lug. As a result, the lug 99 will trip the switch when the table moves to the right and ride thereover when the table moves to the left. The lug 100 is also pivoted to the table and abuts a pin 102 projecting from the table upon the right hand side of said lug so the lug will be effective for tripping the switch when the table moves toward the left and will pass thereover when the table moves toward the right.

In Fig. 16, the solenoid is shown de-energized and the release valve 74 closed with the work table nearing the completion of its idle or return stroke.

When the release switch is closed, the fluid that is being pumped will pass into the constant pressure chamber 84, into the lower part of the relief valve 68, into the sequence valve 69 which will open and from the sequence valve to the controlled pressure compartment 87. Incidently, the top of the release valve 74 above the ball will be filled. The oil in these parts will be under equal pressure which is constant. As the right hand face of the piston has a greater pressure area than the left hand face, the piston will be forced to the left; the oil in compartment 84 backing up into the system.

As the piston is forced to the left, the tool holder 28 will be swung on its pivot from full line position shown in Fig. 3 to dotted line position in which position the tool will be clear of and above the work. Further the tool holder will be held in such elevated position until the release valve 74 is opened by the solenoid.

Now when the lug 99 trips the switch, it will close the same and energize the solenoid which will open the release valve 74 allowing excess oil to escape from the chamber 87 thru pipe 88 and valve 74 to the tank. The oil now forced into the constant pressure chamber will force the piston to the right and swing the tool holder into cutting position. As long as the release remains open, this constant pressure in chamber 84 will act against the piston and hold the same firmly in position against the clapper box.

During the cutting stroke, the fluid in chamber 84 will be under the predetermined constant pressure while the fluid in valves 68, 69 and 74 will be under atmospheric pressure due to the fact that the release valve is open.

Thus, it will be apparent, that according to this invention, the tool holder is elevated by a swinging movement and held clear of the work on the idle or return stroke of the table thru fluid pressure and that it is positively returned to operative or cutting position by fluid pressure which acts during the cutting stroke against the piston and firmly maintains the cutting tool in position. It will also be realized that as the piston moves to the right, it is cushioned by fluid supplied from the pressure system.

In Fig. 17, there is shown a modified form of fluid system in which the chamber 84 of the work cylinder is connected by a fluid pipe 103 with one side of a reversing valve generally denoted by the reference numeral 104 while the chamber 87 of the work cylinder is connected by a pipe 105 with the other side of the reversing valve.

The reversing valve comprises a stem 106 having spaced valve heads 107 and 108 and an intermediate valve head 109. The core rods 110 of solenoids 111, one at each end of the valve stem are pivoted thereto for operating the reversing valve.

The reversing valve is connected at its medial point by a pipe 112 with a power pump 64 which draws fluid such as oil through a pipe 62 dipping into a fluid or oil tank 61 as in the first form. Each end of the reversing valve 104 is connected by a short pipe 113, with a fluid return pipe 114 leading to the tank. This return pipe 114 is also connected with a relief valve 115 of usual construction which is connected to the pump pipe 112 for relieving excess pressure in the pump line as is well known.

The solenoids 111 are shown in circuit with a trip or snap switch 116 of suitable construction by the wires 117 and with a source of energy through pipes 118 and 119, which source of current is connected by a wire 120 with the stationary switch contact 121. The switch which is provided with arms 92 and 93 is operated by lugs 99 and 100 on the work table as in the first form.

As shown in Fig. 17, fluid will pass from the pump 64 to the reversing valve then through pipe 103 into chamber 84 for forcing the piston to the right, the fluid in chamber 87 escaping through pipe 105, reversing valve pipes 113 and 114 to the tank 61. When the valve is shifted to the left, the left hand pipe 113 will be opened by head 107 while the right hand pipe 113 will be closed by head 108 and the pump pipe 112 will discharge upon the right of valve head 109 and fluid will be pumped into chamber 87 for forcing the piston 32a to the left, the fluid in chamber 84 escaping through pipes 103, reversing valve 104, pipes 113 and 114 to the tank 61.

It will be understood that the term "pipe" herein is broadly used to include both a metal or solid pipe or a flexible hose.

From the foregoing, it will be appreciated that a novel improvement has been made in planers that produce automatic control of the tool holder in a positive and reliable manner that will speed up the operation and render the tool holder more effective.

In using this invention, there is little or no likelihood that the tool holder will drop or drop sufficiently to interfere with the work piece during the return stroke. Likewise, there is very little likelihood that the tool holder will cant or lose its vertical operative position during the cutting stroke on account of the constantly acting fluid pressuring during such cutting stroke.

We are aware that many changes may be made and various details of construction modified without departing from the principles of this invention, so we do not propose limiting the patent granted thereon otherwise than necessitated by the appended claims.

We claim as our invention:

1. In a planer, a tool support, a tool holder pivotally mounted upon said support and having a conical recess in its inner face, a cylinder having a conical head fitting in said recess, a piston in said cylinder and having a stem pivotally connected to said tool holder, and a fluid pressure system having connections with said cylinder upon opposite sides of said piston for operating said piston and serving to firmly draw said tool holder against said conical head during the cutting stroke of said tool holder.

2. In a planer, a tool support, a tool holder pivotally mounted upon said support and having a conical recess in its inner face, a cylinder having a conical head fitting in said recess and having a guide bore, a piston in said cylinder having a stem in said guide bore and having a connection with said tool holder and fluid pressure means connected to said cylinder and effective for drawing said tool holder tightly against said support during the cutting stroke of the said tool holder.

3. In a planer, a tool holder support, a tool holder pivoted to said support for swinging movements from inoperative to operative position against said support, a cylinder mounted in said support, a piston in said cylinder having a pivotal connection with said tool holder, a fluid pressure system connected with both sides of said piston for moving said piston in both directions, said fluid pressure system acting against said piston for drawing and maintaining said tool holder tightly against said cylinder during the operative stroke of the planer.

4. In a planer, a tool slide, a clapper box adjacent said slide, a tool holder pivoted to said clapper box and having an outwardly flaring depression upon its inner face, a cylinder mounted in said tool slide and clapper box and having a tapering head portion fitting the depression in said tool holder, a piston in said cylinder, said piston having a pivotal connection with said tool holder and a fluid pressure system having connections with said cylinder upon opposite sides of the piston and being effective for exerting pressure against said piston for drawing and maintaining said tool holder against said tapering head during the cutting stroke of the tool holder.

5. In a fluid pressure system for planers having a reciprocating work table, a cylinder, a piston in said cylinder having unequal pressure faces, a clapper box having a pivotal connection with said piston, a tool carried by said clapper box, a pump having fluid flow connections with said cylinder upon both sides of said piston, a valve communicating with the connection extending to the side of the piston having the greater pressure area, a solenoid for opening said valve, and means operated by said table for energizing said solenoid for opening said valve and maintaining the same open during the cutting stroke of said table.

6. In a fluid pressure system for planers having a reciprocating table, a cylinder, a piston in said cylinder having unequal pressure faces, a clapper box having a pivotal connection with said piston, a cutting tool on said clapper box a pump having a flow connection with the cylinder upon that side of the piston having the lesser pressure face, a second flow connection from said pump to said cylinder upon the side of the piston having the greater pressure area, said last mentioned connection including a spring pressed valve opening in the direction of the cylinder, a release valve having a flow connection with said spring pressed valve, a solenoid for opening said release valve and means operated by said table for energizing said solenoid for maintaining said release valve open during the cutting stroke of said table.

7. In a fluid pressure system for planers having a reciprocating table, a cylinder, a piston in said cylinder having unequal pressure faces, a clapper box pivotally connected to said piston, a tool on said clapper box a pump having a flow pipe connected with said cylinder upon the side of the piston having the lesser pressure face, a valve housing a relief valve, a spring pressed sequence valve and a spring pressed release valve, a flow connection from said flow pipe to said relief valve and said sequence valve, said sequence valve having a flow connection to said cylinder upon the side of the piston having the greater pressure face and a flow connection to said release valve, a solenoid for opening said release valve and means operated by said table for energizing said solenoid during the cutting stroke.

8. In a fluid pressure system for planers having a reciprocating work table, a cylinder, a piston in said cylinder having unequal pressure faces, a clapper box pivotally connected to said piston, a cutting tool on said clapper box a pump having connection with said cylinder upon opposite sides of the piston; the fluid pressure against the greater pressure face of said piston overcoming the pressure against the smaller pressure face for forcing the piston in one direction, a release valve communicating with the connection to the side of the piston having the greater pressure face, a solenoid for controlling said valve and means operated by said table for energizing said solenoid for opening said release valve and maintaining the same open during the cutting stroke of the table.

CARL MOREY.
HARRY A. DINGELDEIN.

REFERENCES CITED

The following references are of record in the file of this patent:

UNITED STATES PATENTS

| Number | Name | Date |
|---|---|---|
| 579,976 | Gordon | Apr. 6, 1897 |
| 1,806,696 | Mesker | May 26, 1931 |
| 1,848,006 | Ferris | Mar. 1, 1932 |
| 1,985,049 | McShane | Dec. 18, 1934 |
| 1,985,443 | Clute | Dec. 25, 1934 |
| 2,008,013 | Foster | July 16, 1935 |
| 2,078,698 | Svenson | Apr. 27, 1937 |
| 2,371,553 | Scott | Mar. 13, 1945 |
| 2,387,012 | Daugherty | Oct. 16, 1945 |

OTHER REFERENCES

Ser. No. 366,840, Obtresal (A. P. C.), published April 27, 1943.